Jan. 23, 1945.　　　　　J. K. ELY　　　　　2,367,933

REGULATING SYSTEM

Filed Jan. 19, 1943

WITNESSES:

INVENTOR
James K. Ely.
BY
ATTORNEY

Patented Jan. 23, 1945

2,367,933

UNITED STATES PATENT OFFICE 2,367,933

REGULATING SYSTEM

James K. Ely, Wilkinsburg, Pa., assignor to Westinghouse Electric & Manufacturing Company, East Pittsburgh, Pa., a corporation of Pennsylvania Application January 19, 1943, Serial No. 472,815

10 Claims. (Cl. 171—229)

This invention relates to voltage regulating systems.

The generators used on aircraft engines to supply constant voltage output over wide ranges of speed, load and temperature conditions require very sensitive voltage regulators to regulate the generator field current and, consequently, the voltage output. Recently a voltage regulator has been developed which utilizes a plurality of long, thin spring leaves of conducting material for connecting or shunting different resistor sections of a field rheostat in circuit with the field winding of the generator to control the excitation thereof. Such voltage regulator switching apparatus is disclosed and claimed in the copending application Serial No. 415,614, filed October 18, 1941, by R. C. Jones, now issued as Patent No. 2,326,036, and has met with success in the aircraft industry, as well as in other applications.

It has been noted, however, that where such regulator switching apparatus is employed, the thin spring leaves of conducting material are sometimes damaged by excessive field current flowing therethrough. Usually such damage is found where the aircraft with which the regulator is employed has been operated at low temperatures, or where the engine is permitted to idle in order to warm up the engine.

It is an object of this invention to provide in a voltage regulating system for preventing the flow of excessive or high current through the regulating switching apparatus.

Another object of this invention is to provide in a voltage regulating system for a generator, for compensating for changes in resistance of the field winding of the generator as the temperature of the windings change independently of the voltage regulator equipment whereby the regulator equipment is utilized at all times only for the purpose of regulating voltage.

A more specific object of this invention is to provide in a voltage regulating system for a generator which is to be operated under extreme temperature conditions for progressively changing connections of a compensating resistor in series circuit with the generator field winding upon the occurrence of some predetermined low temperature and under predetermined operating conditions of the regulating switching apparatus associated with the generator to limit the field current and protect the regulating switching apparatus from damage so long as the low temperature condition is maintained, the compensation for changing the field resistance being obtained independently of the operation of the regulating switching apparatus.

Other objects of this invention will become apparent from the following description when taken in conjunction with the accompanying drawing, in which.

Figure 1:
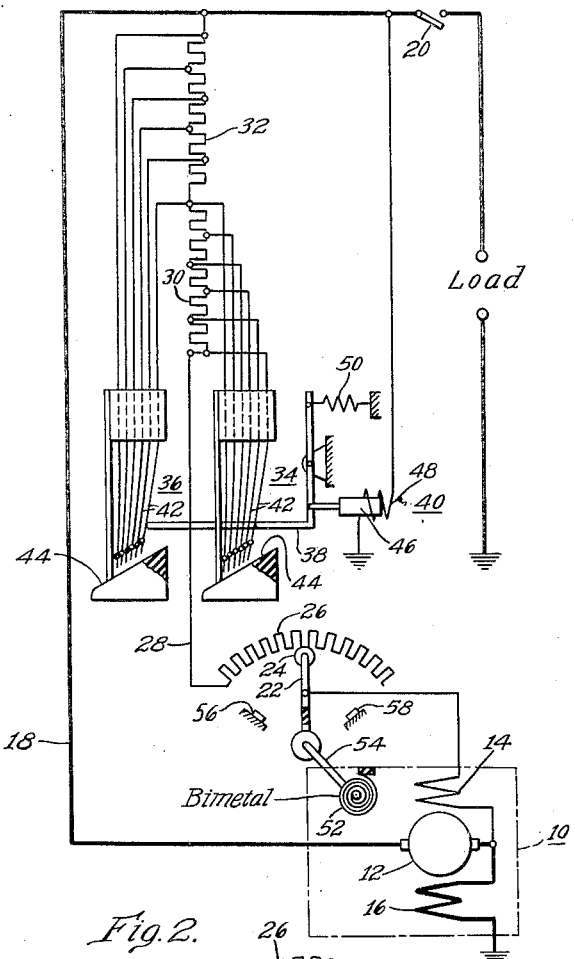
Figure 1 is a diagrammatic view of apparatus and circuits embodying the system of this invention.

Referring to Fig. 1 of the drawing, there is illustrated the regulating system of this invention as employed in conjunction with the generator 10 which is disposed to be driven by any suitable prime mover (not shown). The generator 10 may be of any type, or as illustrated, be of the type commonly employed in aircraft and comprises an armature winding 12, a shunt field winding 14, and a series field winding 16.

As illustrated, one side of the armature winding 12 is disposed to be connected through the conductor 18 and the manual switch 20 to a load (not shown) and from thence to ground, the other side of the armature winding 12 being connected through the series field winding 16 to ground. The shunt field winding 14 is disposed to be connected across the armature winding 12, one end of the shunt field 14 being connected to one side of the armature winding 12, the other end being connected to a movable lever 22 having a rolling contact member 24 on the end thereof disposed to engage in rolling contact with a variable resistor 26 which is connected by conductor 28 through a field rheostat formed of series connected resistors 30 and 32 to the conductor 18. The purpose of the variable resistor 26 will be explained more fully hereinafter.

The connections to shunt or connect the different sections of the resistors 30 and 32 in circuit relation with the shunt field winding 14 are controlled by a plurality of switching units 34 and 36 respectively, which are actuated in a predetermined manner by a pivotally mounted driver member 38 in response to the energization of an electromagnet 40. The switching units 34 and 36 and the manner of operating them to obtain a progressive but staggered operation thereof to obtain a progressive but staggered shunting or connecting of the sections of resistors 30 and 32 respectively, are disclosed in the aforementioned Jones patent.

Briefly, each of the units 34 and 36 comprises a plurality of spring leaves 42 of conducting material having one end fixed. The other end of each of the leaves 42 carries a contact member or button and is normally self-biased to seat against a sloped stop 44. The fixed ends of the conducting spring members 42 are connected to different taps along the resistor associated with the respective switching units 34 and 36. The spring leaves 42 of the units 34 and 36 are so assembled or the driver member 38 is so constructed, as to obtain a progressive but staggered operation of the leaf members 42 of the two units when the driver member 38 is actuated as disclosed and claimed in the Jones patent identified hereinbefore.

The electromagnet 40 comprises a core member 46 connected at one end to the pivotally mounted driver member 38 and is normally energized by the energizing winding 48. The energizing winding 48 is connected at one end to the conductor 18, the other end being connected to ground, and when energized, functions to pull the driver member 38 about its pivot against the pull of the biasing spring 50. Thus the energizing winding 48 is connected in shunt with respect to the load and its energization is a measure of the voltage drop across the load.

The variable resistor 26 is disposed to be connected in series circuit with the field winding 14 in order to protect the conducting spring leaf members 42 of the switching units 34 and 36 from excessive or high field currents flowing therethrough when the leaves are actuated to shunt the sections of the resistors 30 and 32, the resistor 26 effectively limiting the field current and consequently limiting the current flowing through the spring leaves 42.

As illustrated in Fig. 1, in order to control the connecting of progressive sections of the variable resistor 26 in circuit with the field winding 14, a thermostat 52 is provided, being so mounted or associated with the field winding 14 that it is responsive to changes in temperature of the generator field winding. In the embodiment illustrated, the thermostat 52 is illustrated as being a spiral type thermostat having one end secured to the frame of the generator 10, with the movable end secured to a shaft 54 which functions to effect a rotation of the lever 22 which carries the rolling contact member 24. Stops 56 and 58 are disposed in the path of movement of the lever 22 to limit its range of movement to the length of the resistor 26. The use of stops 56 and 58 will not in any manner damage the thermostat 52, but instead function only to, in effect, increase the contact pressure between the lever 22 and the stops without detrimentally distorting the thermostat as the temperature of the field winding is increased above some low predetermined temperature.

The variable resistor 26 is selected in accordance with the changes in the resistance of the field winding 14 which will be encountered as the temperature decreases to some low predetermined temperature. For example, if the ohmic resistance of the field winding 14 is 2 ohms at 25° C., the maximum field current obtainable at 28 volts is 14 amperes, whereas in actual practice at a temperature of −50° C., the resistance of the field winding 14 decreases to 1.43 ohms, so that the maximum field current at 28 volts is then 19.7 amperes, thereby in effect permitting 40% more field current to flow at the extremely cold temperature than is obtained at normal operating temperatures. The resistor 26 is, therefore, selected and the stop 56 so positioned to offset the resistance change in the field winding 14 which is to be expected in operation, the thermostat 52, of course, having been selected to have substantially constant expansion characteristics for operation over the range of temperatures which has such a detrimental effect upon the resistance of the field winding 14.

In operation, assuming that the generator 10 is driven to deliver a predetermined voltage and the manual switch 20 is in its circuit closing position, then the energizing winding 48 of the electromagnet 40 is energized to operate the switching units 34 and 36 in a predetermined manner whereby a number of the sections of the resistors 30 and 32 respectively, are connected in series circuit relation with the shunt field winding 14. Under normal operating conditions, the lever 22 abuts the stop 56 so that none of the variable resistor 26 is connected in the field circuit of the generator.

If for any reason the load supplied by the generator 10 is changed, for example, if the load is decreased, then the winding 48 is energized to actuate the driver member 38 against the bias of its spring member 50 to effect a progressive but staggered release of the leaf members 42 of the switching units 34 and 36 to alternately control the connecting of the progressive sections of the resistor elements 30 and 32 respectively, in series with the field winding 14 to effect a decrease in the energization of the field winding and thereby decrease the voltage of the generator 10.

If, on the other hand, the load is increased and the winding 48 is so deenergized that the driver member 38 is actuated under the influence of the spring 50 to effect a switching operation of the switching units 34 and 36 to force their leaf spring members 42 progressively but in staggered relation away from their sloped stops 44 to progressively but in staggered relation shunt the resistor sections of the associated resistors 30 and 32 respectively. This operation to effect the alternate shunting of progressive sections of each of the resistors 30 and 32 from circuit with the field winding 14 effects an increase in the energization of the field winding and consequently, an increase in the voltage of the generator 10.

In both of the operations described hereinbefore, it has been assumed that the aircraft is operating at normal or higher temperatures and that the thermostat 52 is in the position where the lever 22 is seated against the stop 56 to shunt all of the variable resistor 26 from the field winding circuit. However, if during either of the operations described hereinbefore, the aircraft is operated at abnormally low temperatures, or if the engine is cold when first started, then at some predetermined low temperature, preferably at about 25° C., the thermostat 52 is so cooled as to effect a contraction of its spiral turns and effectively rotate the lever 22 from its position adjacent the stop 56 to progressively connect sections of the resistor 26 in series circuit with the field winding 14.

Figure 3:
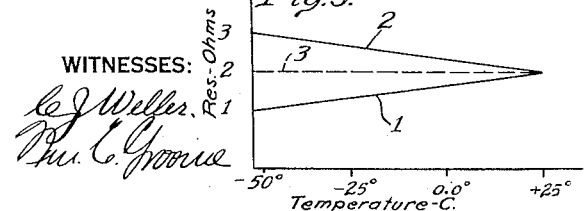
Fig. 3 is a graph, the curves of which illustrate the change in field resistance together with the change in the compensating resistance as utilized in this invention.

The lower the temperature of the field winding 14, the more the resistance of the field winding is decreased, as illustrated in Fig. 1 and curve 1 of Fig. 3 of the drawing. Likewise, as the temperature is decreased, the thermostat 52 contracts to progressively connect in more of the variable resistor 26 as represented by the curve 2 of Fig. 3 to, in effect, balance the change in resistance of the field winding 14, giving a resulting substantially constant equivalent resistance for the field winding as represented by the curve 3 of Fig. 3. Similarly, as the temperature of the field winding 14 increases at some temperature below the predetermined low temperature, the thermostat 52 functions to actuate the lever 22 to rotate towards its fixed stop 56 and thereby progressively decrease the amount of compensating resistance which is connected in series circuit with the field winding 14.

It is quite apparent that when the compensating resistor 26 is progressively connected in series circuit with the field winding 14 as the temperature of the field winding decreases below a predetermined low temperature, that the field current which flows through the conducting leaf spring members 42 which have been actuated to their circuit closing position due to the energization of the winding 48 of the electromagnet 40, is maintained substantially constant independent of the change in temperature of the field winding 14 and only dependent upon the energization of electromagnet 40. Where all of the leaf spring members 42 are in circuit closing position, the resistor 26 also functions to limit the current flow through the leaf springs. The sections of the variable resistor 26 are connected in series circuit with the field winding 14 only so long as the abnormal temperature conditions exist. At all times while the resistor 26 is connected in circuit with the field winding 14, the effective resistance of the resistor is maintained at only that amount necessary to compensate for the change in resistance of the field winding 14.

It is apparent from the foregoing that the compensation for the change in resistance of the field winding 14 is effected independently of the operation of the switching units 34 or 36, and independently of the resistor elements 30 and 32 so that at no time is any part of the resistor elements 30 or 32 utilized for compensating for the change in the resistance of the field winding. In other words, the resistor units 30 and 32 are employed only for the purpose of regulating voltage. By employing the thermostat 52 and the variable compensating resistor 26 in the regulating system as described hereinbefore, it is further evident that damage to the spring leaf members of the switching apparatus when they are in the closed circuit position to shunt all of resistor units 30 and 32 is prevented by limiting the field current.

While the system described hereinbefore is efficient where the lever 22 employed is of light weight, in some of the larger generators it is found that the weight of the lever 22 and the shaft 54 is sufficient to render the bimetal thermostat 52 inaccurate in response to the change in temperatures of the field winding 14. To overcome such inaccuracies where larger units are being regulated and where it is not essential to maintain the weight of the regulating apparatus at a minimum the embodiment of this invention illustrated in Fig. 2 is to be preferred.

Figure 2:
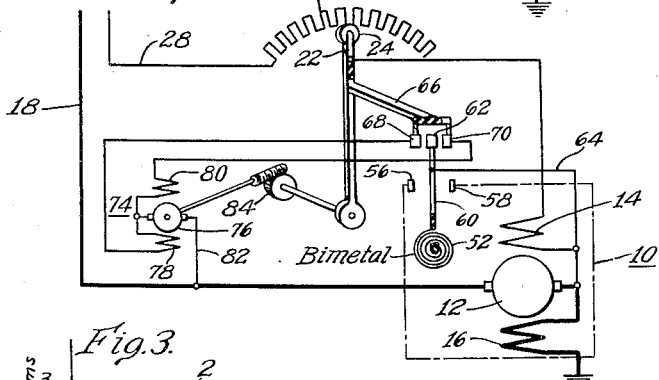
Fig. 2 is a diagrammatic view of another embodiment of this invention.

In the embodiment of the invention of Fig. 2 the generator 10 and the main connections to the regulator and load are the same, the only change being in the auxiliary apparatus employed for progressively connecting the sections of the compensating resistor 26 in series circuit with the field winding 14.

As illustrated in Fig. 2, the spiral thermostat 52 is secured with its inner end secured to the frame of the generator 10, its outer free end being disposed to carry an arm 60 having a movable contact member 62 on the outer end thereof. The contact member 62 is electrically connected through the arm 60 and the conductor 64 to one end of the armature winding 12 of the generator 10. The lever 22 carrying the rolling contact member 24 thereon is illustrated as carrying an auxiliary arm 66 having opposed contact members 68 and 70 on its outer end in spaced relation and insulated from each other for cooperating with the movable contact member 62 the range of movement of which is limited by insulating stops 56 and 58 carried by the frame of the generator 10.

In order to actuate the lever 22, a reversible motor 74 is provided, the motor comprising an armature member 76 and field windings 78 and 80 connected at one end thereof to one end of the armature winding 76, the other ends of the field windings 78 and 80 being connected to the contact members 68 and 70 respectively. The other end of the armature winding 76 is connected by conductor 82 to the other end of the armature winding 12 of the generator 10. The armature 76 of the motor 74 is connected through a worm and gear drive 84 to drive the lever 22 to effect a movement of the rolling contact member 24 in wiping engagement with the variable resistor unit 26.

In the embodiment represented by Fig. 2, the operation of the switching units 34 and 36 to connect alternate sections of the resistor units 30 and 32 as described with respect to the embodiment of Fig. 1, is the same as described therein for normal temperature conditions. However, when the aircraft is being operated in abnormally low temperatures, or the temperature of the field winding 14 is decreased for any given reason, the thermostat 52 contacts to drive the lever 60 away from the fixed stop 56 toward the contact member 70 which is carried by the lever 22.

When the contact member 62 engages the contact member 70, a circuit is closed which extends from one side of the armature winding 12 through conductor 82, armature member 76 and field winding 80 of the motor 74, through contact members 70 and 62 to the other side of the armature winding 12 to energize the motor 74. When thus energized the motor 74 drives the lever 22 in a clockwise direction to progressively connect sections of the variable resistor 26 in series circuit with the field winding 14 of the generator to compensate for the decrease in the resistance of the generator field winding.

As will be noted, as the lever 22 is driven in the clockwise direction, the contact member 70 carried thereby is likewise moved in a direction away from the movable contact member 62 to effect a deenergization of the motor 74 and thereby prevent an overrun or the connecting of too many sections of the resistor 26 in the field winding circuit. For each decrease in the change in temperature of the field winding 14, the thermostat 52 functions to complete the energizing circuit to effect the connection of more of the resistor 26 in series circuit with the field winding 14.

If during the operation at these abnormally low temperatures the temperature of the winding 14 increases, then the thermostat 52 functions to expand and drive its movable contact member 62 toward the contact member 68 carried by the lever 22 to a point where it engages therewith and completes a circuit which extends from one side of the armature winding 12 of the generator 10 through conductor 82, armature winding 76, and field winding 78 of the motor 74 through contact members 68 and 62 to the other side of the armature winding 12 to energize the motor 74. When thus energized the motor drives the lever 22 in a counter-clockwise direction to progressively decrease the resistance of the resistor 26 which is connected in the field winding circuit. Again the movement of the lever 22 effects a separation of the contact members 62 and 68 to so deenergize the motor 74 as to prevent an overrun or too great a decrease in the resistance of the variable resistor 26 connected in the field winding circuit. As in the previous embodiment, the stops 56 and 58 carried by the frame of the generator 10 limit the extent of movement of the movable contact member 62 to the range of the variable resistor 26 which is employed for compensating for the change in resistance of the field winding 14 at the abnormally low temperatures.

In this embodiment of the invention, it is readily apparent that no stress or strain due to the driving parts utilized for connecting the resistor in its circuit relation with the field winding 14 is encountered since the thermostat 52 only drives the contact member 62. As in the previous embodiment, the apparatus and circuit employed permit the compensation for the change in the resistance of the field winding 14 independently of the operation of the regulating equipment employed in conjunction therewith, and prevent damage to the spring leaves of the regulating equipment when they are in the closed circuit position to shunt off all of resistor units 30 and 32 by effectively limiting or maintaining substantially constant the field current regardless of the change in temperature below a predetermined low temperature.

While this invention has been described with reference to particular embodiments thereof, it is, of course, not to be limited thereto except insofar as is necessitated by the scope of the appended claims.

I claim as my invention:

1. In a voltage regulating system, in combination, a generator the voltage of which is to be regulated, a field winding for exciting the generator, a rheostat for controlling the voltage impressed on the field winding, means for actuating the rheostat in response to the generator voltage, an auxiliary variable resistor, and means responsive to a decrease in temperature below a predetermined temperature of the generator for progressively effecting the connection of progressive sections of the variable resistor in circuit relation with the rheostat and field winding of the generator to compensate for changes in the resistance of the field winding occasioned by said decrease in temperature.

2. In a voltage regulating system, in combination, a generator the voltage of which is to be regulated, a field winding for exciting the generator, a rheostat for controlling the voltage impressed on the field winding, means for actuating the rheostat in response to the generator voltage, an auxiliary variable resistor, and a thermostat disposed to be responsive to a decrease in the temperature of the field winding of the generator below a predetermined temperature for progressively effecting the connection of progressive sections of the variable resistor in circuit relation with the rheostat and field winding of the generator to compensate for changes in the resistance of the field winding occasioned by said decrease in temperature.

3. In a voltage regulating system, in combination, a generator the voltage of which is to be regulated, a field winding for exciting the generator, a rheostat for controlling the voltage impressed on the fielding winding, means for actuating the rheostat in response to the generator voltage, an auxiliary variable resistor, and means responsive to a decrease in temperature below a predetermined temperature of the generator for progressively effecting the connection of progressive sections of the variable resistor in circuit relation with the rheostat and field winding of the generator to compensate for changes in the resistance of the field winding occasioned by said decrease in temperature, said means effecting the compensation for changes in the resistance of the field winding for all decreases below the predetermined temperature independently of the rheostat, the rheostat being actuated to control the voltage independently of the change in temperature of the generator.

4. In a voltage regulating system, in combination, a generator the voltage of which is to be regulated, a field winding for exciting the generator, a rheostat for controlling the voltage impressed on the field winding, means for actuating the rheostat in response to the generator voltage, an auxiliary variable resistor, a spiral shaped thermostat disposed to be responsive to a decrease in the temperature of the field winding of the generator below a predetermined temperature for progressively effecting the connection of different sections of the variable resistor in circuit relation with the rheostat and the field winding to compensate for changes in the resistance of the field winding occasioned by said decrease in temperature, and means associated with the thermostat for limiting its range of movement upon changes in temperature to substantially the range of the variable resistor.

5. In a voltage regulating system, in combination, a generator the voltage of which is to be regulated, a field winding for exciting the generator, a rheostat for controlling the voltage impressed on the field winding, means for actuating the rheostat in response to the generator voltage, an auxiliary variable resistor disposed to be connected in series circuit relation with the field winding, means for progressively effecting the connection of sections of the variable resistor, said means comprising a motor operated lever, and thermostatic means disposed to be responsive to a decrease in temperature of the field winding of the generator below a predetermined temperature for controlling the operation of the motor operated lever, the connection of the sections of the variable resistor in series with the field winding effecting a compensation for changes in the resistance of the field winding occasioned by said decrease in temperature below the predetermined temperature independently of the actuation of the rheostat.

6. In a voltage regulating system, in combination a generator the voltage of which is to be regulated, a field winding for exciting the generator, a rheostat for controlling the voltage impressed on the field winding, means for actuating the rheostat in response to the generator voltage, an auxiliary variable resistor disposed to be connected in series circuit relation with the field winding, a lever disposed to be actuated for progressively effecting the connection of sections of the variable resistor, a reversible motor disposed to be energized to actuate the lever, and thermostatic means disposed to be responsive to changes in temperature of the field winding of the generator below a predetermined temperature for controlling the operation of the reversible motor and the connections of the sections of the resistor, the progressive connection of the sections of the resistor in series with the field winding effecting a compensation for changes in the resistance of the field winding occasioned by said changes in temperature below the predetermined temperature independently of the actuation of the rheostat.

7. In a voltage regulating system, in combination, a generator the voltage of which is to be regulated, a field winding for exciting the generator, a rheostat for controlling the voltage impressed on the field winding, means for actuating the rheostat in response to the generator voltage, an auxiliary variable resistor disposed to be connected in series circuit relation with the field winding, a lever disposed to be actuated for progressively effecting the connection of sections of the variable resistor, a reversible motor disposed to be energized to actuate the lever, thermostatic means disposed to be responsive to changes in temperature of the field winding of the generator below a predetermined temperature for controlling the operation of the reversible motor and the connections of the sections of the resistor, the progressive connections of the sections of the resistor in series with the field winding effecting a compensation for changes in the resistance of the field winding occasioned by said changes in temperature below the predetermined temperature independently of the actuation of the rheostat, and means associated with the thermostatic means for limiting the movement of the lever upon changes in temperature to substantially the range of the variable resistor.

8. In a voltage regulating system, in combination, a generator the voltage of which is to be regulated, a field winding for exciting the generator, a rheostat for controlling the voltage impressed on the field winding, means for actuating the rheostat in response to the generator voltage, an auxiliary variable resistor disposed to be connected in series circuit relation with the field winding, a lever disposed to be operated for progressively effecting the connection of sections of the variable resistor, a pair of opposed contact members carried by the lever, a reversible motor having field windings connected to the opposed contact members disposed to operate the lever, a thermostat disposed to be responsive to changes in temperature of the field winding of the generator below a predetermined temperature, a contact member disposed for movement in response to a movement of the thermostat into engagement with one of the opposed contact members to control the operation of the motor and the connection of the sections of the resistor, the progressive connection of the sections of the resistor in series with the field winding effecting a compensation for changes in the resistance of the field winding occasioned by said changes in temperature below the predetermined temperature independently of the actuation of the rheostat.

9. In a voltage regulating system, in combination, a generator the voltage of which is to be regulated, a field winding for exciting the generator, a rheostat for controlling the voltage impressed on the field winding, means for actuating the rheostat in response to the generator voltage, an auxiliary variable resistor disposed to be connected in series circuit relation with the field winding, a lever disposed to be operated for progressively effecting the connection of sections of the variable resistor, a pair of opposed contact members carried by the lever, a reversible motor having field windings connected to the opposed contact members disposed to operate the lever, a thermostat disposed to be responsive to changes in temperature of the field winding of the generator below a predetermined temperature, a contact member carried by the thermostat disposed for movement in response to a movement of the thermostat into engagement with one of the opposed contact members to control the operation of the motor and the connection of the sections of the resistor, the contact members carried by the lever cooperating with the contact member of the thermostat to control the energization of the motor and prevent an overrun operation of the lever for any given movement of the thermostat, the progressive connection of the sections of the resistor in series with the field winding effecting a compensation for changes in the resistance of the field winding occasioned by said changes in temperature below the predetermined temperature independently of the actuation of the rheostat.

10. In a voltage regulating system, in combination, a generator the voltage of which is to be regulated, a field winding for exciting the generator, a rheostat disposed to be connected in circuit with the field winding for controlling the voltage impressed thereon, means including a plurality of long thin conducting members disposed for progressive movement to control the connecting of the rheostat in the field winding circuit in response to the generator voltage, the long thin conducting members being disposed for movement to circuit closing position for shunting the rheostat under predetermined operating conditions for the generator, an auxiliary variable resistor disposed to be connected in series circuit with the field winding and the rheostat, and a thermostat disposed to be responsive to a change in the temperature of the field winding of the generator below a predetermined temperature for progressively controlling the connections of progressive sections of the variable resistor in circuit relation with the rheostat and field winding of the generator to compensate for changes in the resistance of the field winding occasioned by said changes in temperature independently of the operation of the rheostat, the compensating resistor effectively limiting the current flow through the long thin conducting members when the conducting members are in the circuit closing position to shunt the rheostat as the temperature of the field winding changes below the predetermined temperature.

JAMES K. ELY.